(No Model.)
L. R. BENDER.
FARM GATE.
No. 419,002. Patented Jan. 7, 1890.
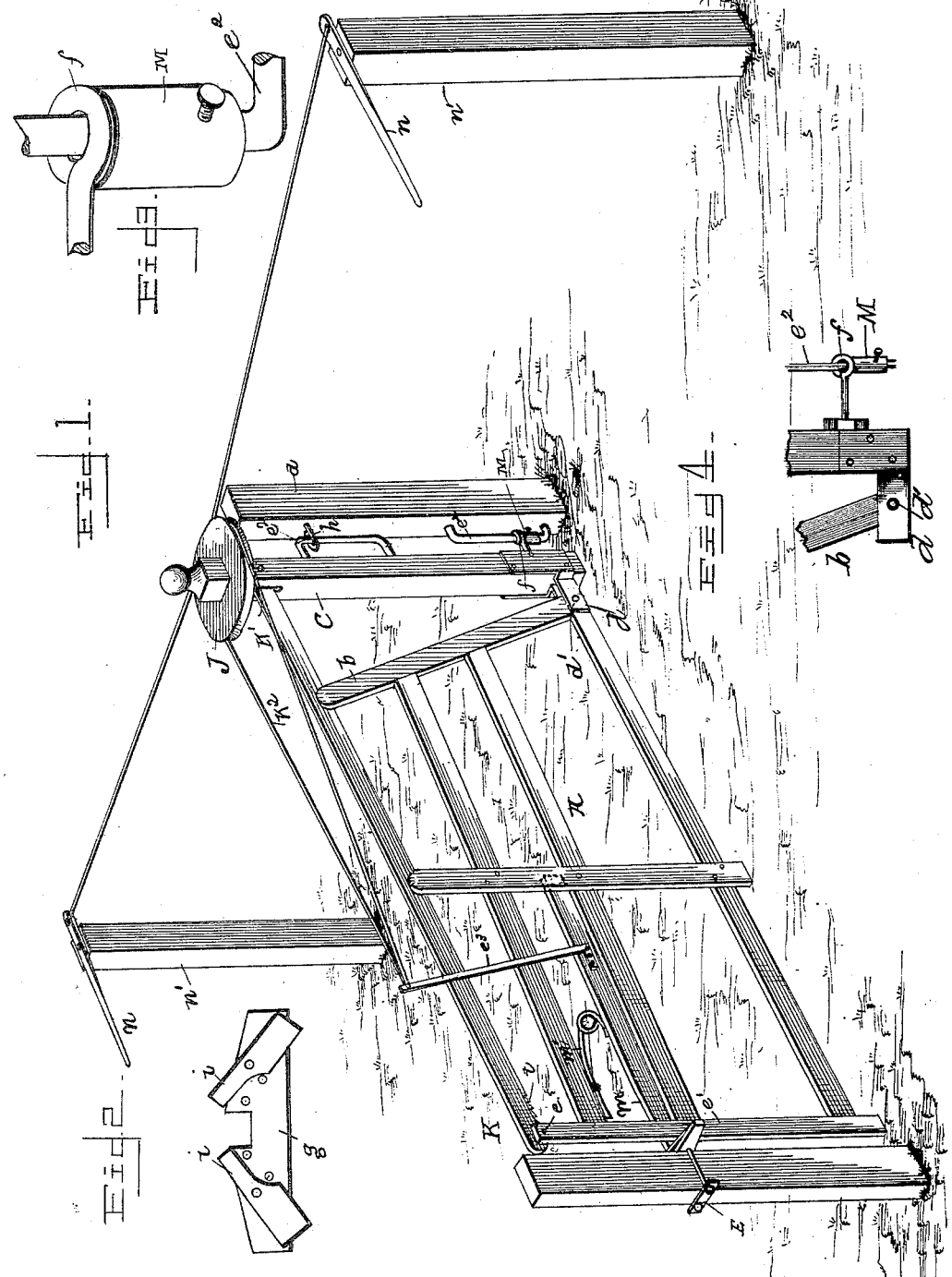
WITNESSES
Walter H. Pumphrey
Paul W. Stevens
INVENTOR
Ledru R. Bender
By Myers & Co
Attorneys.

UNITED STATES PATENT OFFICE.

LEDRU R. BENDER, OF ELIZABETHVILLE, PENNSYLVANIA.

FARM-GATE.

SPECIFICATION forming part of Letters Patent No. 419,002, dated January 7, 1890.

Application filed May 6, 1889. Serial No. 309,742. (No model.)

*To all whom it may concern:*

Be it known that I, LEDRU R. BENDER, a citizen of the United States of America, residing at Elizabethville, in the county of Dauphin and State of Pennsylvania, have invented certain new and useful Improvements in Farm-Gates, of which the following is a specification, reference being had therein to the accompanying drawings.

My invention pertains to an improvement in gates; and it chiefly consists in the peculiar structure, combination, and arrangement of the parts, substantially as hereinafter more fully set forth and described.

In the drawings, Figure 1 is a perspective view showing the entire gate; and Figs. 2, 3, and 4 are detail views thereof.

My gate is so constructed as to admit of its being thrown wide open before reaching it for the convenience of persons driving, and in like manner closed behind them after passing through it, and also to admit its elevation and adjustment to any desired height, either in order that it may pass any obstruction, as snow, or to permit sheep or hogs to pass under it while preventing the passage of larger animals, or to admit its being swung free over an inclined surface.

Gate A is provided with an inclined standard $b$, which is pivoted to heel-post $c$ by means of the L-shaped plates $d$ and pivotal bolt $d'$, an L-shaped plate being disposed on either side of heel-post $c$ and inclined standard $b$. A hinge is thus formed for elevating or lowering the gate at an angle, the gate being supported in its elevated position by means of bar K, pivoted at K', and notched at $t$ to clutch the clutch-bolt $e$, disposed in standard $e'$. Heel-post $c$ is hinged to gate-post D by means of bolted hinge staples $e^2$ and eyebolts $f$ and $h$. Latch-block G is provided with stop-latches $i\ i$ pivoted thereto, which latter fall into the position shown in Fig. 2 solely by their own gravity, which prevents latch $m$ from swinging over the latch-block when the gate is closed, and by means of clip E the latch-block may be adjusted to any height to suit the gate, which is also adjustable as to altitude on the slide-hinges, and rigidly secured in position by means of sleeve M.

The mechanism for opening or closing the gate consists in part of the wheel J, having a groove to secure thereon the cord or wire strand $k^2$, the wheel being pivotally disposed on post C, the cord or wire being passed through an eye in lever $e^3$. Lever $e^3$ is secured to latch-bar $m$ at its lower end, and latch-bar $m$ is held down in position by spring $m'$, as shown. Cord or wire $k^2$ is passed through the eye of the lever $e^3$, and thence partly around wheel $j$, and its ends are secured to corresponding levers $n$, pivoted on post $n'$, and hence it follows that by actuating either of said levers latch $m$ is retracted and simultaneously the gate thrown open or closed, as may be desired.

Thus constructed, a very efficient and inexpensive gate is produced.

Having thus fully described my invention, what I claim, and desire to secure by Letters Patent, is—

The gate consisting of the heel-post having staple and eye connection with the hinge-post, the gate proper, comprising the upwardly and inwardly inclined rear end bar, the parallel proximately L-shaped brackets or plates, with their lower horizontal arms projecting from near the lower end of the heel-post, between which is pivoted the lower rear end of the gate, the latch held in position by a spring and engaging a catch, the lever secured at its lower end to said latch, near the rear end of the latter, the lever-actuating lines or cords connected to the upper end of said lever and passed around a pulley or wheel on the upper end of the heel-post and connected to distantly-placed elevated hand-levers, substantially as set forth.

In testimony whereof I affix my signature in presence of two witnesses.

LEDRU R. BENDER.

Witnesses:
S. H. KNEILEY,
A. M. TSCHOPP.